United States Patent [19]

Hofer et al.

[11] Patent Number: 4,987,875
[45] Date of Patent: Jan. 29, 1991

[54] FUEL INJECTION PUMP FOR SUPPLYING THE COMBUSTION CHAMBERS OF INTERNAL COMBUSTION ENGINES INTENDED FOR VEHICLE OPERATION

[75] Inventors: Gerald Hofer, Weissach-Flacht; Helmut Laufer, Gerlingen; Max Staubel, Stuttgart, all of Fed. Rep. of Germany

[73] Assignee: Robert Bosch GmbH, Stuttgart, Fed. Rep. of Germany

[21] Appl. No.: 938,683

[22] Filed: Dec. 5, 1986

[30] Foreign Application Priority Data

Feb. 22, 1986 [DE] Fed. Rep. of Germany ....... 3605824

[51] Int. Cl.$^5$ ............................................. F02M 39/00
[52] U.S. Cl. .................................... 123/449; 123/419; 123/373
[58] Field of Search ............... 123/449, 373, 370, 365, 123/419, 422, 436

[56] References Cited

U.S. PATENT DOCUMENTS

| | | | |
|---|---|---|---|
| 3,749,070 | 7/1973 | Oishi | 123/422 |
| 3,797,470 | 3/1974 | Beck | 123/373 |
| 4,357,662 | 11/1982 | Schira | 123/436 |
| 4,513,721 | 4/1985 | Ina | 123/419 |
| 4,519,352 | 5/1985 | Eheim | 123/449 |
| 4,567,870 | 2/1986 | Tumber | 123/365 |
| 4,635,602 | 1/1987 | Eheim | 123/449 |

FOREIGN PATENT DOCUMENTS 0107820 6/1983 Japan ..................... 123/370

Primary Examiner—Carl Stuart Miller
Attorney, Agent, or Firm—Edwin E. Greigg

[57] ABSTRACT

A fuel injection pump for supplying the combustion chambers of internal combustion engines intended for vehicle operation having, in addition to a fuel quantity regulating device operative in accordance with operating parameters of the engine, an adjusting device in which in accordance with an anti-buckling signal obtained from fast relative movements on the vehicle the fuel supply quantity of the fuel injection pump is varied in phase opposition to the acceleration event triggering the bucking. This adjustment is accomplished in accordance with the invention by intervention with a setting device of the fuel injection pump, by means of which device the basic setting of the fuel supply quantity is adjusted independently of the supply quantity varied by the fuel quantity regulating device.

37 Claims, 4 Drawing Sheets

FUEL INJECTION PUMP FOR SUPPLYING THE COMBUSTION CHAMBERS OF INTERNAL COMBUSTION ENGINES INTENDED FOR VEHICLE OPERATION

BACKGROUND OF THE INVENTION

The invention is directed to improvements in fuel injection pumps having an anti-bucking adjustment feature.

Because of the elastic suspension of the engine and chassis, a motor vehicle is a structure capable of vibrating, and if disturbed it can be made to vibrate in a variably damped manner. Such disturbances may include a sudden increase in the fuel quantity varying abnormally the fuel metering rate at which the combustion chambers of the engine are supplied, or a sudden increase in running resistance moment in response to external causes, such as a pothole in the road. The vibrations that are perceived as unpleasant, for example in the form of changes in rpm or of relative movements between the engine and the vehicle body, are normally in the range between 1 and 8 Hz, most likely approximately 5 Hz, and are called "bucking". The result is longitudinal vibrations, in the direction the vehicle is moving, which are exacerbated by the driver's reaction at the gas pedal and are promoted by soft vehicle suspensions. The determining factor is above all the phase displacement between the incident rpm or vehicle speed and the fuel metering quantity.

To overcome bucking, various devices have beer developed, such as that disclosed in German Offenlegungsschrift No. 33 43 854, for phase-displaced imposition of a correction signal upon a control variable for setting the fuel quantity, the control variable being calculated in accordance with operating parameters. In this case the intervention is performed solely in the context of an electronic governor, with a corrected control variable for the electromagnetically actuated supply quantity adjusting device appearing at the output of the governor; in calculating the control variable, both the operating state of the engine at the time and vehicle behavior, or bucking, are taken into account.

From German patent application No. P 34 27 224, U.S. application Ser. No. 023,946, filed 9-26-8, which is not a prior publication to this invention, instead of making an electronic intervention, it is also known to attain damping of bucking in a mechanically governed fuel injection pump by active variation of the fuel injection quantity, in particular to improve the phase location. In this kind of fuel injection pump, the engine is elastically supported in the vehicle body, and the fuel injection pump is connected to the engine. A connection, containing a differentiation device, with a quantity adjusting device of the fuel injection pump is pivotably connected to the vehicle body, functioning such that when there are rapid relative movements between the engine and the body, correspondingly rapid corrections of the fuel injection quantity are provided. Only the differentiated signal is used for corrective adjustment, however, in such a way that no adjustment of the fuel injection quantity takes place when the relative engine movements are slow.

In such an apparatus, the correction engages the governor lever to which the governor spring of a mechanical speed governor is attached, and which serves to indicate the desired torque or to set an rpm. In another version, the intervention is done hydraulically, via the adjusting member of a centrifugal speed governor. Both interventions have the disadvantage on the one hand acting indirectly, via interposed elastic members, upon the fuel supply quantity, adjusting device, and on the other hand of being affected by operating parameters, that is, by the random variation in load.

OBJECT AND SUMMARY OF THE INVENTION

It is a principal object of the fuel injection pump according to the invention that a fuel injection quantity correction can be furnished very directly to the fuel supply quantity adjusting device, regardless of supply quantity adjustments as a function of other operating parameters typically provided in fuel injection pumps. The intervention is performed immediately, and without being affected by other control variables, upon which the correction is normally merely superimposed.

Another object, and a particularly simple embodiment of the invention, is defined by use of an adjusting lever, which is already known for instance in a distributor injection pump, and offers particularly favorable opportunities for intervention in the basic setting of the fuel injection pump. While such adjusting levers are known, for instance from German Offenlegungsschrift No. 23 49 655 or German Offenlegungsschrift No. 29 09 415, the invention provides that advantageous actuating devices can be so disposed and located that there is enough room for them. Such intervention possibilities are not limited to distributor injection pumps, however, and in particular to distributor injection pumps of the reciprocating piston type found in the above-cited prior art.

Still another advantageous object of the invention provides improvements for injection pumps that are controlled by annular slides.

Yet another advantageous object of the invention provides improved triggering of an anti-bucking signal.

It is a further object of the invention that the mass of the engine can also be taken into account in detecting bucking.

It is a still further object of the invention to provide very accurate detection of bucking by detecting an rpm signal, on which bucking vibrations are superimposed and which is converted via a differentiating member into the anti-bucking signal.

It is still another object of the invention to provide a detection apparatus having the advantage that the aspects of its suspension and the characteristics of the engine suspension do not directly affect the magnitude and effectiveness, in terms of phase location, of the anti-bucking signal. To avoid encountering such factors the invention provides means by which the signal formation is advantageously obtained, such as via a pendulum in the interior of the fuel injection pump itself.

It is still another object of the invention that no additional provisions have to be made on the vehicle in the engine compartment between the engine, or the fuel injection pump connected to it, and the vehicle body to accommodate the invention.

It is still a further object of the invention that the anti-bucking signal be advantageously transmitted to the actuating device by hydraulic means, because this enables reliable transmission independently of the vehicle electrical system or of mechanical friction and the effect of hysteresis. This transmission means has the further advantage that in installing the bucking signal transducer only the location of the most favorable signal detection point need be taken into account.

It is yet a further object of the invention to provide a hydraulically operating differentiating member.

It is yet a further object to overcome particularly difficult conditions for installation, to provide an electric actuation, perhaps in combination with a fluidic bucking signal transducer.

It is still an additional object to provide, in a particularly advantageous manner, that internal pressure available in the interior of a distributor fuel injection pump, for example, can be used as working pressure for a control motor, the control chamber pressure of which is controlled with the aid of a magnetic valve controlled by the anti-bucking signal.

Yet another object of the invention is advantageously to attain a more accurate signal for the appearance of bucking movements via interposed differentiating members, and depending upon how the differentiating members are embodied, to make a correction of the fuel injection quantity in only a pulsed manner; this correction may be performed at predetermined specific variables, determined by stops. However, the imposed variables or differential variables may also be varied as a function of certain parameters or of a certain order of magnitude of the bucking vibration, which can also be done mechanically in the fuel injection pump according to the invention.

The invention will be better understood and further objects and advantages thereof wil become more apparent from the ensuing detailed description of preferred embodiments taken in conjunction with the drawings.

DESCRIPTION OF THE PREFERRED EMBODIMENTS

Figure 1:
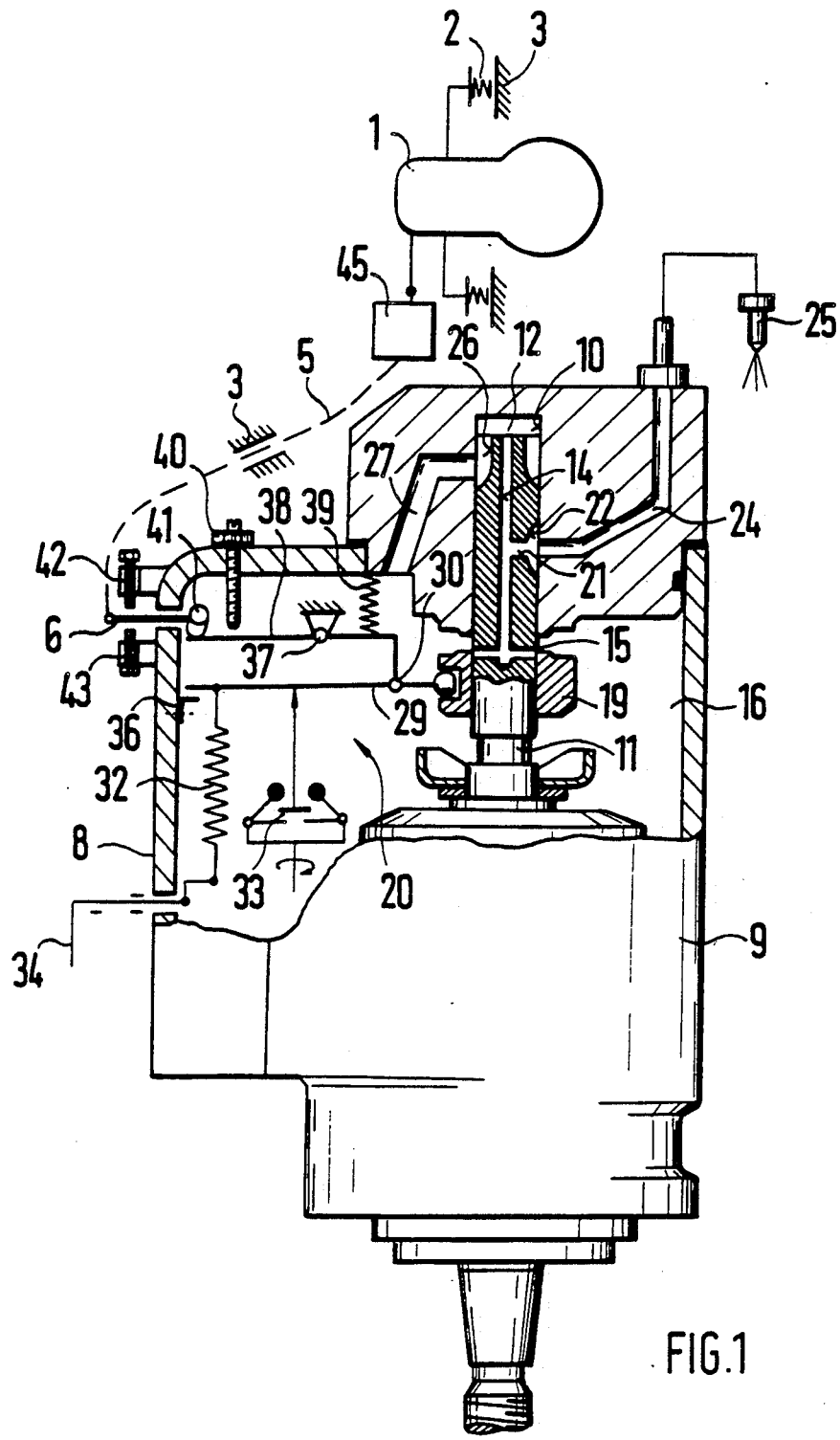
FIG. 1 shows a first exemplary embodiment in a fragmentary section through a distributor fuel injection pump having actuation of a control cam derived directly from the transverse movement of the engine.

Referring to FIG. 1, a symbolically represented internal combustion engine 1 is suspended via elastic bearings 2 in a body 3, not shown in further detail, of a vehicle driven by this engine. As a rule these bearings 2 are rubber elastic bearings, which have both suspension and damping or shock absorption properties. They are typically used to prevent vibration of the engine from being transmitted directly to the body. Movements of the engine itself, in particular about its longitudinal axis, occur during rapid changes in load or rpm. The engine reacts particularly, however, to what in the above discussion is called bucking. A transmitting device 5 is rigidly connected to the motor and at its other end is connected to an adjusting lever 6. The transmitting device 6 is braced in a stationary manner on the vehicle body. It may be realized in the manner of a Bowden cable, for example, or as a lever linkage arrangement. A fuel injection pump, in this case a distributor injection pump 8, is rigidly connected to the engine 1. The basic task of the transmitting device is to transmit the movement of the engine relative to the body to the adjusting lever 6 of the fuel injection pump mounted on the engine.

Bucking is perceived as particularly disturbing in passenger vehicles. The soft suspension of the body that they predominantly have, so as to make the ride more comfortable, leads to bucking, especially in bodies having a low mass. Fuel injection pumps for such vehicles equipped with Diesel engines are predominantly of the distributor type, for instance of the reciprocating piston type, as shown in principle in a fragmentary sectional view in FIG. 1. The intervention may also be performed in fuel injection pumps of other types, however.

In the distributor fuel injection pump described here by way of example, a pump cylinder 10 is provided in its housing 9, and in this pump cylinder a pump piston 11 is set for simultaneous reciprocation and rotation by means not shown. A pump work chamber 12 is defined in the pump piston cylinder by the pump piston and communicates via an axial relief line with a relief opening 15 at a portion of the pump piston that protrudes into a suction chamber 16. The suction chamber is filled with fuel under pressure by a fuel feed pump, not shown here, and serves in a known manner to supply fuel to the pump work chamber 12. An annular slide 19, as the fuel supply quantity adjusting device, is disposed on the portion of the pump piston protruding into the suction chamber 16, and is displaceable in a sealing manner on the pump piston with its upper end face, for instance, controlling the relief opening 15. The annular slide 19 thereby assumes an axial position, determined by a governor 20, on the pump piston.

In the course of the pump piston supply stroke, from the time the initially closed relief bore 15 is opened, the pump work chamber is made to communicate with the suction chamber. From this point on, during the supply stroke of the pump piston, the supply of fuel from the pump work chamber 12 through the relief line 14 and a transverse bore 21 that leads to a distributor opening 22 is precluded. The distributor opening 22 cooperates with pressure lines 24 distributed on the circumference of the pump cylinder and corresponding in number with the engine cylinders that are to be supplied. The pressure lines 24 lead to the various injection valves 25. During the rotation of the pump piston and its supply stroke, the distributor opening comes to communicate with one of these pressure lines at a time, in succession, so that the fuel positively displaced from the pump work chamber via the relief line 14 reaches each injection valve 25.

The supply of fuel to the pump work chamber is effected via intake grooves 26, which are distributed over the circumference of the pump piston and correspond in number to the number of pressure lines to be supplied; they are in continuous communication with the pump work chamber. During the intake stroke, one of these intake grooves at a time comes to communicate with an intake line 27 branching off from the pump suction chamber 16.

The axial location of the annular slide 19 determines the supply stroke by which the pump piston effectively pumps fuel at high pressure to the injection valves. The axial setting is adjustable by means of an adjusting lever 29, which is pivotable about a shaft 30 and on which an rpm transducer 33, often a centrifugal rpm transducer, acts counter to the force of a governor spring 32. This transducer is driven in synchronism with the driving rpm of the injection pump and tends to displace the annular slide 19, counter to the force of the spring 32 of the fuel quantity adjusting device, to positions that correspond to a lesser fuel injection quantity. This typically occurs in the breakaway situation. In a known manner, the governor spring 32 is adjustable by means of an adjusting lever 34 that is adjustable arbitrarily by the driver of the vehicle having the engine being described, in accordance with the desired torque or in accordance with the rpm at a given load; in the course of this adjustment, the governor spring 32 is prestressed more or less, or in the case of an adjusting governor it is in the form of a spring packet that is adjusted rigidly together with the adjusting lever. In the breakaway situation, the force of the spring 32 is then overcome by the rpm transducer 33. To set the maximum fuel injection quantity, a full-load stop 36 is provided, which may optionally also be adjustable in a manner known per se and is also adjustable in accordance with operating parameters.

The basic setting of the distributor fuel injection pump of this known type is accomplished with the aid of a setting device in the form of a setting lever 38 that is pivotable about a point 37 integral with the housing. The shaft 30 of the adjusting lever 29 is attached to one end of the setting lever 38, and on that lever arm the setting lever 38 is also loaded by the force of a restoring spring 39, while on its other lever arm, an adjustable stop 40 is provided, against which this setting lever is held by the force of the spring 39. In so doing the spring pivots the setting lever in such a way that the shaft and at the same time the basic setting of the annular slide 19 are shifted in the direction of a lesser fuel injection quantity. With the adjustable stop, in a known manner, the basic setting of the annular slide 19 can accordingly be sensitively shifted toward an increased or decreased quantity.

Instead of, or in addition to, the stop 40, the invention now provides an actuating device in the form of a cam 41, which is rotatable by the adjusting lever 6 and in so doing pivots the setting lever 38 toward an increased or decreased quantity depending on the rotational position. The degree of adjustment is limited by a first stop 42 and a second stop 43 for the adjusting lever 6, both of these stops being adjustable, and with them it is also possible to set and limit the maximum injection quantity, instead of with the stop 40 otherwise provided in such distributor fuel injection pumps. As already noted above, the adjusting lever 6 is adjustable in accordance with the anti-bucking signal, which in the example being described is mechanically detected by means of the transverse movement of the engine 1. If the engine swings outward, then the transverse movement having the travel length s takes place with a 90° phase displacement relative to the speed of the transverse movement, or once again with a 90° phase displacement with respect to the acceleration that triggers this speed. Using the travel signal as the anti-bucking signal, it is now possible to counteract the source of the phase displacement between the rpm and the injection quantity and to vary the instantaneous fuel quantity in a compensatory direction. In this sense, the fuel injection quantity can be set to have the same phase as the acceleration. Naturally, such interventions can also be made in accordance with an anti-bucking signal formed from the engine rpm, using suitable actuating devices that will be described in the ensuing exemplary embodiments. This anti-bucking signal can be formed as either a mechanical or an electrical variable.

In the example being described, the engine movement is transmitted directly to the adjusting lever 6; for slow changes that should not be interpreted as bucking to be precluded as influential factors, it is also advantageously possible to incorporate a differentiating member 45 into the connection between the engine 1 and the adjusting lever 6 or cam 41, in the manner to be described in connection with the ensuing exemplary embodiments.

Figure 2:
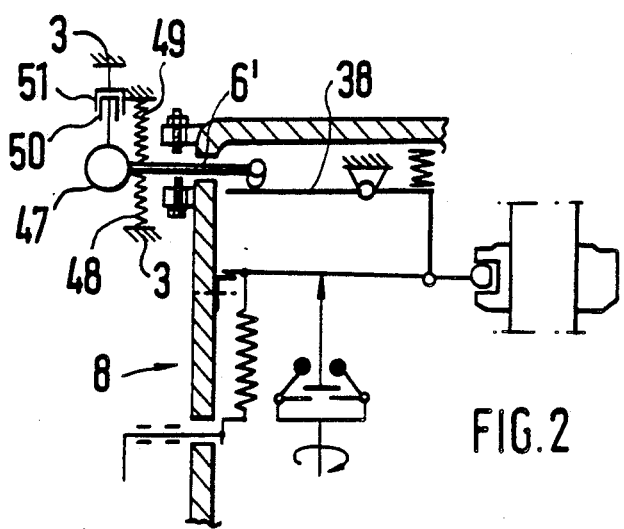
FIG. 2 shows a second exemplary embodiment in a detailed fragmentary section of a distributor injection pump, with a resiliently suspended mass for actuating the control cam of FIG. 1.

In the exemplary embodiment of FIG. 2, substantially the same detail of the distributor fuel injection pump 8 is shown, except that here instead of a connection with the engine 1 at the adjusting lever 6', an additional mass 47 is secured there, and the lever is braced with respect to the vehicle body 3 between a first spring 48 and a second spring 49. Also connected with the mass 47, in the movement direction of the adjusting lever 6', is a damping piston 50, which moves into a damping cylinder 51 braced in a stationary manner on the body 3.

With this embodiment, if the body begins a bucking vibration, then the mass 47, because of its inertia, moves relative to the body 3, in a manner similar to the movement by the engine described in the exemplary embodiment of FIG. 1. The outward swing of the mass 47 on the lever arm of the adjusting lever 6' counter to the restoring forces of the first spring 48 and second spring 49 is further damped by means of the piston/cylinder combination 50/51. This unit can also be understood as a differentiating member, by means of which, when there is a relative movement of the body 3 with respect to the injection pump 8, the mass 47 is deflected, the adjusting lever 6' pivoted, and the fuel injection quantity varied via the adjusting lever 38. The quantity of fuel delivered to the engine, and hence the torque brought to bear by the engine, is varied with a phase displacement of 180° relative to the deflection movement, thus compensating for the acceleration that triggers the deflection.

Figure 3:
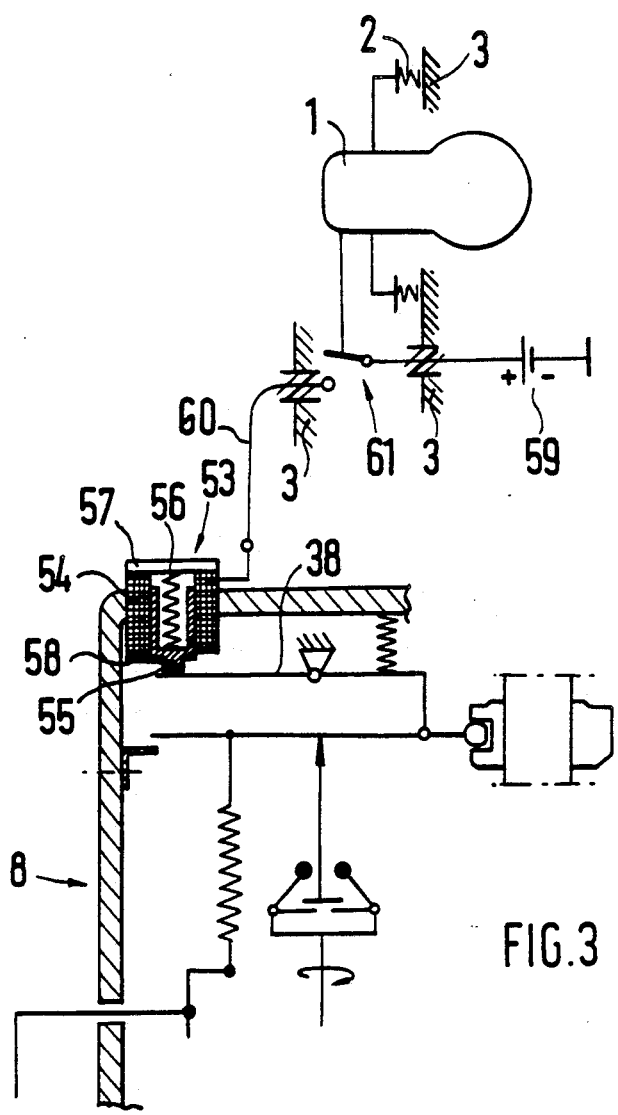
FIG. 3 shows in a fragmentary sectional view a third exemplary embodiment of the invention having a control magnet engaging the setting lever of a distributor fuel injection pump, the current circuit of the magnet being controlled via a switch triggered directly by the transverse movement of the engine.

Instead of the actuating device in the form of a cam shown in FIGS. 1 and 2, an adjusting magnet 53 can also be provided as shown in FIG. 3, which engages the same point on the setting lever 38 as did the cam of FIGS. 1 and 2, the fuel injection pump otherwise being embodied in the same way. The adjusting magnet has a coil 54, in the core of which an armature 55 is movable counter to the force of a restoring spring 56. The armature has a first stop 57 and a second stop 58, which although not further shown are nevertheless adjustable in a manner known per se. The coil 54 is connected to a source of current 59 via a line 60, in which a switch 61 is incorporated. With its moving part, this switch is coupled directly to the engine 1, which is suspended as shown in FIG. 1. By means of the transverse movement of the engine in its bearings 2, the switch 61 is either closed or opened. Accordingly, the armature is either attracted counter to the force of the spring 56, or moved by this spring into its second end position. With this embodiment, the same effect is attained as that attained by the mechanical device for transmitting engine movement shown in FIG. 1. If the torque that the engine is supposed to produce is increased, then the switch 61 closes, and the adjusting magnet 53 reduces the set fuel injection quantity, independently of the function of the governor, by adjusting the setting lever 38. The normal regulating functions of the governor go on parallel to this, in the manner descibed and as in the exemplary embodiments of FIGS. 1 and 2, so that the actual fuel supply quantity regulation is unaffected. When the engine pivots back to its original position, the switch 61 opens again, and as the armature 55 drops the fuel injection quantity is increased.

Figure 4:
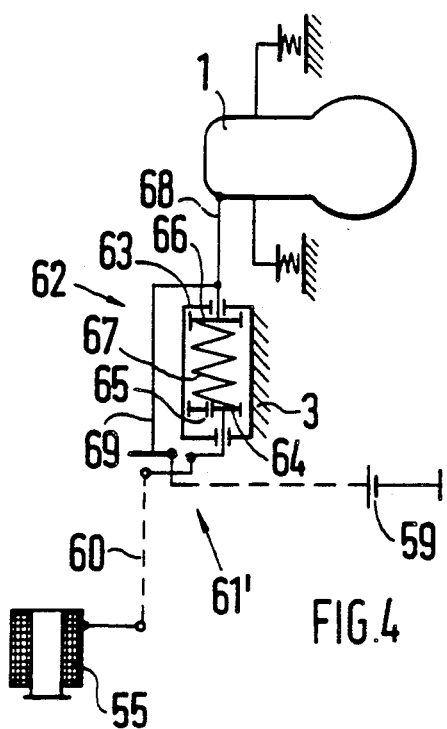
FIG. 4 shows in a schematic view a fourth exemplary embodiment, which is a modification of the exemplary embodiment of FIG. 3 having a differentiating member incorporated between the engine and the switch.

The alternative shown in FIG. 2 and having the additional mass 47 is also applicable in principle to this embodiment, and is illustrated in FIG. 4. Instead of the direct coupling to the engine by means of the switch 61, a differentiating member 62 can also be advantageously interposed between the engine and the switch. With a differentiating member of this kind, only a fast change in travel is furnished as a switching pulse to the switch 61', while slow movements are recognized as non-bucking and are not taken into account. The differentiating member 62 is embodied as a cylinder 63 in the form of a closed housing that is connected in a stationary manner with the body 3. In the closed housing, an adjustable wall 64 is provided comprising a piston that is tightly displaceable in the cylinder and has a throttle bore 65, through which the housing parts before and after the movable wall can be connected to one another. Also displaceable in the closed housing or cylinder 63 is a spring plate 66, between which and the displaceable wall 64 a compression spring 67 is fastened. The spring plate 66 is freely movable with respect to the fluid (gas or liquid) enclosed in the closed housing, so that even in the event of relatively fast movements of the spring plate, no fluid pressures are built up there.

From the movable wall 64, a link extends through an aperture to the outside where it is connected to a first part of the switch 61', while extending sealingly out of the closed housing from the spring plate 66 is an actuating element 68, by way of which the spring plate 66 is connected to the engine, or to an elastically suspended mass that moves relative to the body, in the movement direction of the engine. From the actuating element, a rigid connection 69 further leads to the other part of the switch 61', which is closed or opened when there is a relative movement of the movable wall 64 with respect to the spring plate 66. The switch 61', as in the exemplary embodiment of FIG. 3, is located in the line 60 from the current source 59 to the adjusting magnet 55.

If an adjusting movement of the fast type occurs on the part of the engine, then the movable wall 64 initially acts as an unmoving wall, because of the throttling effect of the throttle 65. Accordingly, the spring plate compresses the compression spring 67 and via the rigid connection 69 actuates the switch 61'. However, if only a slow movement of the engine, or of the elastically suspended mass, takes place, then an equalization of pressure can take place via the throttle 65, so that the unit comprising the movable wall 64, the spring 67 and the spring plate 66 are displaced together in the closed housing 63, whereupon the switch position of the switch 61' remains unchanged. In principle, the switch 61' thus moves along with the movement of the moved masses when slow movements occur, and it opens whenever the bucking frequency of 3 to 4 Hz occurs. A differentiating member of the type described may for example also be used in the exemplary embodiment of FIG. 1.

Figure 5:
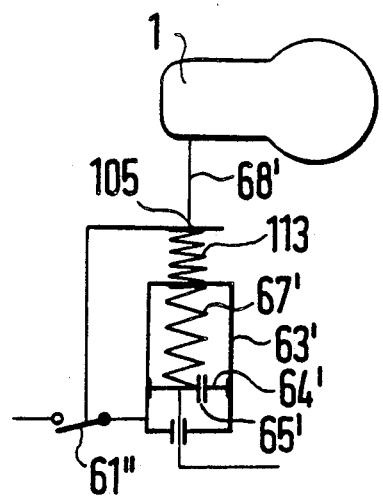
FIG. 5 shows in a schematic view a fifth exemplary embodiment, having a differentiating member modified from that of FIG. 4.

In FIG. 5, the inversion of the operating principle of the differentiating member 62 is shown. Here, what was the movable wall 64 in FIG. 4 becomes stationary, or fixed to the body, but once again has the throttle 65', which connects the parts of the closed housing 63' with one another. Between the now stationary wall 64' and the housing, a compression spring 67' is inserted on the far side of the stationary connection with the wall 64'. The accordingly relatively movable housing is coupled via a spring 113 with a support part 105 which is connected to the movable mass and on the other end with one part of the switch 61''. The other part of the switch is connected to the cylinder, or closed housing 63', so that the switch is actuated when there is a relative movement between the cylinder and support part 105.

Figure 6:
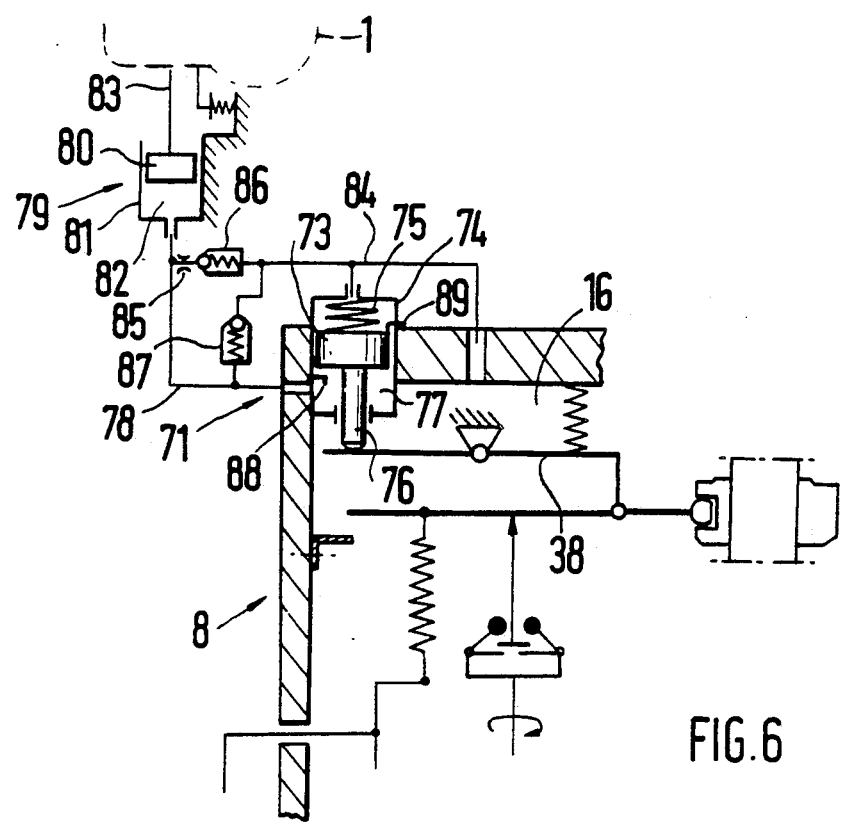
FIG. 6 shows in a fragmentary sectional view a sixth exemplary embodiment, with hydraulic transmission of transverse engine movment to a hydraulic control motor for adjusting the setting of a distributor injection pump.

In the embodiment of FIG. 6, instead of a cam 41 or adjusting magnet 53, a hydraulic control motor 71 is provided comprising a movable wall—in the example shown a piston 73—which is tightly displaceable in a sealed housing 74, in this case a cylinder. On one side, the piston 73 is acted upon by a restoring spring 75, which tends to adjust the piston, along with an associated adjusting tang 76 arranged to emerge from the cylinder 74 toward the suction chamber of the fuel injection pump, to act on the setting lever 38. The piston 73 encloses a pressure chamber 77 in the cylinder 74, on the side of the adjusting tang 76, and the pressure chamber 77 communicates via a control pressure line 78 with a fluidic positive displacement device 79, acting as a bucking transducer. This bucking transducer 79 comprises a piston 80, which is tightly-fitted but displaceable in a cylinder 81, where it defines a fluid chamber 82. The piston 80 is connected on its other end to the elastically supported mass via a rod 83. The piston/cylinder combination 80/81 may naturally comprise a diaphragm pump instead. The cylinder, or diaphragm pump housing, is connected in a stationary manner to the vehicle body.

Branching off from the control line 78, via a throttle 85 and a pressure limiting valve 86 following it, is a relief line 84 that discharges into the suction chamber 16 of the fuel injection pump. The portion of the cylinder 74 nearer the spring chamber also communicates with this relief line. While the pressure limiting valve 86 opens the suction chamber 16 toward the relief side, parallel to this valve a filling valve 87 that communicates directly with the control line 78 is provided, which once again is embodied as a check valve, but in this case opening from the suction chamber 16 toward the control line 78.

During operation, the apparatus described functions as follows:

If the elastically suspended mass, that is, the engine 1, executes a transverse movement of the slow type, then the piston 80 displaces only a small amount of fluid per unit of time from chamber 82, which then, once a minimum pressure in the control line 78 is exceeded, drains back to the suction chamber 16 via the throttle 85. If the piston 80 is retracted in the opposite direction, then fuel is reaspirated from the suction chamber 16 via the filling valve 87. In this manner, the system between the pressure chamber 77 and the fluid chamber 82 is always filled. If a fast transverse movement of the engine now takes place, then because of the throttling by the throttle 85, a higher pressure can build up, which being directed into the pressure chamber 77 deflects the piston 73 counter to the force of the spring 75 such that the adjusting tang 76 is pulled away from the setting lever 38, and the basic setting of the fuel injection pump is adjusted to produce a reduced injection quantity. An increase in torque is counteracted in this manner by a reduction of the fuel injection quantity.

In the reverse situation, where there is a movement in the opposite direction of the engine, the pressure in the fluid chamber 82 is decreased, so that under the influence of the restoring spring 75 the piston 73 is adjusted toward the setting lever 38, and the setting lever effects a variation of the basic injection quantity to produce an increased quantity. The piston 73 has an adjustable stop 88, via which the magnitude of the increased fuel quantity is limited, so that the fuel injection quantity cannot exceed the emissions limit of the engine. The piston 73, under the influence of the spring 75, comes to rest on this stop 88 whenever the movements of the piston 80 are not fast enough to bring about a pressure increase at the throttle 85. The correction in the direction of a lesser fuel injection quantity can be set in the same manner with a second stop 89 on the spring side of the piston 78. In such an embodiment, the correction quantity can also be adapted to certain dynamic conditions and varied in accordance with operating parameters. In this embodiment, the throttle 85, as a damping throttle, simultaneously acts as a differentiating member, so that only fast changes in movement of the piston 80 lead to a pressure rise and to an adjustment of the adjusting tang 76. Without the differentiating member, the apparatus would substantially correspond to that of FIG. 1, with the mechanical linkage of FIG. 1 being replaced by a hydraulic linkage.

Figure 7:
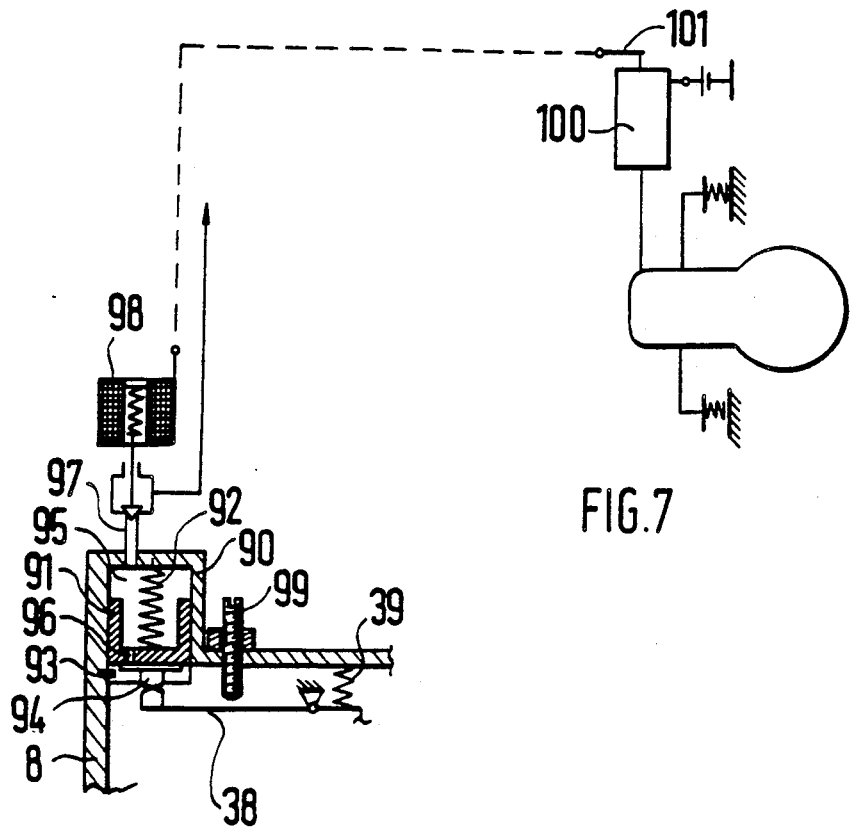
FIG. 7 shows a seventh exemplary embodiment, in a fragmentary sectional view as a modification of the exemplary embodiment of FIG. 6, having a hydraulic control motor for actuating the setting lever of a distributor injection pump and with electromagnetic control of the working pressure of the hydraulic control motor as a function of the control movement.

In the exemplary embodiment of FIG. 7, a modified form of the hydraulic actuation of the setting lever 38 is provided. To this end, instead of the cylinder 74 of FIG. 6, for example, a cylinder 90 that is open toward the pump suction chamber 16 is provided in the fuel injection pump 8; an adjusting piston 91 is provided displaceable in this cylinder 90 and between the closed end of the cylinder 90 and the piston 91 a restoring spring 92 is enclosed, by which spring the piston is movable to a stop 93. The crown of the piston is oriented toward the pump suction chamber and serves as a stop face; the piston has a tang 94, which in the pivoting direction of the setting lever 38 acts as the actuating device of the setting lever 38 counter to the force of its restoring spring 39. The spring chamber 95 enclosed on the rear end of the adjusting piston and receiving the restoring spring 92 communicates continuously with the suction chamber via a throttle 96. At the same time, a pressure fluid line 97, in the present case embodied as a relief line, discharges into the spring chamber 95, the flow cross section of the line 97 being controlled by a magnetic valve 98. The pressure fluid line leads in a pressure-relieved manner, for instance to the fuel supply container from which the fuel injection pump is supplied with fuel, or to the suction side of the fuel supply pump by which the suction chamber 16 of the fuel injection pump is filled with fuel. Since the stop 93 acts to limit the corrective increased fuel quantity, and in this process the necessity for the maximum fuel injection quantity not to exceed the emissions limit must be taken into account, a second stop 99 is also provided, by means of which the adjusting of the setting lever 38 is limited directly or indirectly, via the adjusting piston 91, to produce a reduced injection quantity.

The magnetic valve 98 of the relief line 97 is now controlled in turn in accordance with the occurrence of a bucking signal, for example analogously to the exemplary embodiment of FIG. 3 or FIG. 4. Movement of the engine, as a mass that is elastically suspended with respect to the body, and optionally with the interposition of a differentiating member 100, can trip a switch 101 in the current supply circuit of the magnetic valve 98, by means of which upon opening of the relief line 97 the spring chamber 95, simultaneously acting as a control pressure, is relieved, so that the fuel pressure of the suction chamber 16 saves to displace the adjusting piston 91 counter to the force of the spring 92 permitting an adjustment of the setting lever 38 in the direction of a decreased injection quantity, until this setting lever comes to rest on the second stop 99. In this variant, the adjusting piston 91 can also move back, beyond this position. Contrarily, if the magnetic valve 98 closes, then a pressure that corresponds to the pressure in the suction chamber 16 can build up in the spring chamber 95 via the throttle connection 96. With a hydraulically equalized pressure, the adjusting piston 91 now moves as far as the stop 93, under the influence of the restoring spring 92, and corrects the fuel injection quantity in the direction of an increased injection quantity. In this case, once again, an electrical anti-bucking signal obtained from the rpm can easily be furnished to the magnetic valve 98 and a correction thereby made in a fuel injection pump that is otherwise governed or controlled mechancally. This embodiment has the advantage that no particular adjusting pressure has to be generated, and that the introduction or obtaining of the anti-bucking signal is easily accomplished, even under the most difficult of installation conditions. In fuel injection pumps that do not have any suction chamber of the kind shown here, the interior can also be relieved of pressure, in a manner that is the reverse of what is shown in FIG. 7, and in that case the pressure fluid line 97 would then furnish the pressure, while the adjusting piston would be loaded by the spring in the opposite direction.

As the bucking signal transducer, once again the transducer 80, 81 shown in FIG. 6 can be used, which triggers a switch according to FIG. 4 instead of the piston 75, the magnetic valve 98 being actuated in turn by this switch. Alternatively, however, the switch may also control an adjusting magnet as in FIG. 3.

Figure 8:
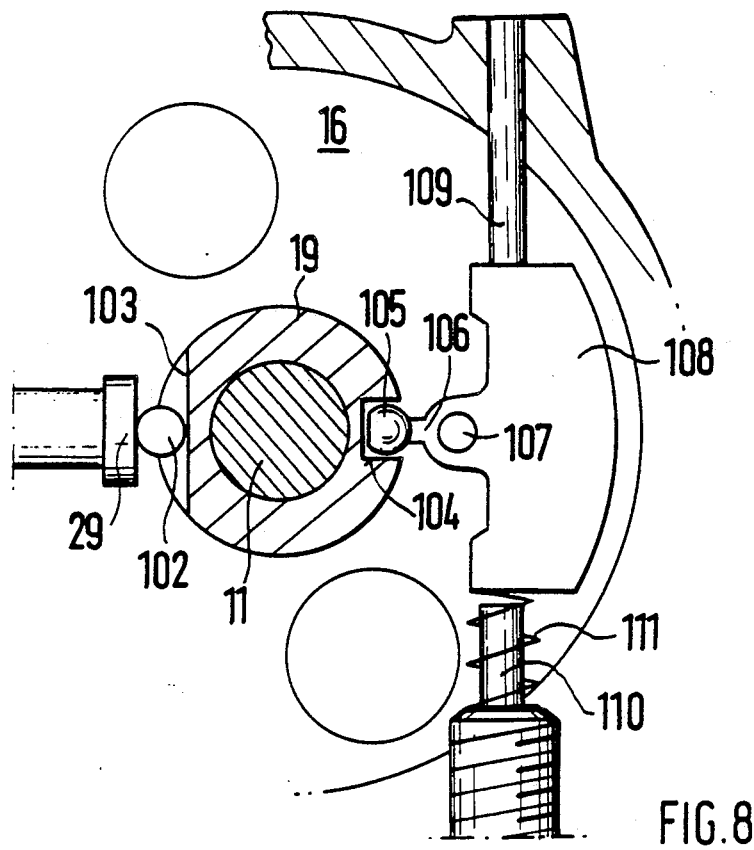
FIG. 8 shows a partial cross-sectional view of an eighth exemplary embodiment of the invention, having a mass that detects bucking and is attached to the interior of a distributor injection pump, for adjusting a fuel quantity adjusting device, embodied as an annular slide, of a fuel injection pump.

FIG. 8 shows a different possibility of intervention in a fuel injection pump, which in the form shown should be considered an alternative to the embodiment of FIG. 2. FIG. 8 is a cross-sectional view of an injection pump which like the exemplary embodiment of FIG. 1 has a reciprocating pump piston, with the section in this case taken in the radial plane. The annular slide 19 also known from FIG. 1 is supported on the pump piston and engaged by the adjusting lever 29. For coupling with the annular slide, the adjusting lever 29 has a ball head 102 on its end, and the ball head engages a groove 103 of the annular slide that extends obliquely with respect to the radial plane, or in other words to the plane of FIG. 8. On the diametrically opposite section of the annular slide, an axially parallel longitudinal groove 104 is provided, which is likewise engaged by a ball head 105. As long as the ball head 105 maintains its position, the annular slide 19 can be moved axially back and forth by the adjusting lever 29 in the manner shown in FIG. 1, without also executing a rotational movement. In this manner, the relationship of the ball head 102 to its outset position at the groove 103 remains unchanged.

The ball head 105 is now seated on the end of one arm 106 of a lever, which is pivotable about a shaft 107 that is axially parallel to the shaft of the pump piston; on its other end this lever has an inertial mass 108, which is pivotable between a first stop 109 and a second stop 110. At least one of the stops is arranged to be adjustable, and the mass 108 is retained by at least one retaining spring 111 on one of the stops 109. The mass 108 is located in the suction chamber 16 of the fuel injection pump and is surrounded by fuel supplied under pressure. If the vehicle body executes bucking movements, then the inertial mass 108 can execute relative movements counter to the retaining spring 111 and thereby rotate the annular slide 19. By means of this rotation, the head 102 enters different portions of the oblique groove 103, causing the annular slide to be displaced in such a manner that it effectively controls the injection quantity. Thus a basic setting of the fuel injection pump can be performed in this way, and the member that detects bucking can be combined with the actuating device and accommodated inside the fuel injection pump. This has the advantage that the correction provisions can be performed independently of provisions at the location of installation in connection with the vehicle body.

In addition to the above-described possibilities of intervention via various kinds of basic setting devices, the subject of the invention can also be achieved with other basic setting devices. If instead of the annular slide 19 that is adjusted axially to adjust the fuel quantity, an annular slide is used that is rotated to adjust the quantity and that has oblique control edges for varying the variable effective pump piston pumping stroke, then instead of the intervention shown in FIG. 8 a stroke adjustment of the annular slide can be performed. It is equally possible, however, to rotate the annular slide 19 or to reverse it via actuating devices in accordance with electrically formed anti-bucking signals as well, analogously to the embodiments of FIGS. 1–7.

An anti-bucking signal or control variable derived from the rpm is also attainable by mechanical means, however, by deriving the bucking signal for the anti-bucking signal to be formed from it on the basis of a fuel injection pump suction chamber pressure, for example, that is formed in synchronism with rpm.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A fuel injection pump for supplying combustion chambers of internal combustion ingines intended for vehicle operation, having a fuel supply quantity adjusting device (19) adjustable in accordance with operating parameters of the engine by means of a primary fuel quantity regulating device (20) and further adjustable by means of a secondary adjusting device (41) responsive to an anti-bucking signal, said secondary adjusting device (41) being adapted to counteract bucking by varying a fuel supply quantity, said anti-bucking signal being selectively formed based upon occurrence of at least one vehicular operating phenomena, said phenomena being collectively known as bucking, characterized in that the secondary adjusting device (41) comprises an actuating means (6) to which said anti-bucking signal is provided, which actuating means operates a fuel quantity setting means (38) to vary a basic setting of the fuel supply quantity of the fuel injection pump by at least a predetermined amount, and oppositely disposed adjustable stop means (42, 43) which limit travel of said adjusting device in a direction of a lesser or greater fuel injection quantity upon the appearance of bucking that accelerates or decelerates the vehicle according to a direction of the movement of said adjusting device, thereby determining said predetermined amount of said basic setting of said fuel supply quantity adjusting device.

2. A fuel injection pump as defined by claim 1, further characterized in that said fuel quantity setting means comprises a setting lever connected to an adjusting lever of the fuel supply quantity adjusting device for adjustment thereof.

3. A fuel injection pump as defined by claim 1, further wherein the fuel supply quantity adjusting device comprises a reciprocating pump piston on which an annular slide is movable by the fuel quantity regulating device to control a means defining a relief opening provided in the pump piston and arranged to communicate with a pump work chamber of said fuel injection pump, and said fuel quantity setting means serves to vary a basic position of the annular slide.

4. A fuel injection pump as defined by claim 1, further characterized in that the bucking is detected by means of a relative movement of an inertial mass that is elastically supported relative to a body of the vehicle so as to undergo a complemental movement thereto, the complemental relative movement being used at least indirectly to form the anti-bucking signal.

5. A fuel injection pump as defined by claim 4, further characterized in that the relative movement detected is converted into the anti-bucking signal via a differentiating member.

6. A fuel injection pump as defined by claim 4, further characterized in that the relative movement detected comprises a variation in engine rpm, which variation forms an rpm signal and is converted into the anti-bucking signal via a differentiating member.

7. A fuel injection pump as defined by claim 4, further characterized in that the inertial mass is the engine, the relative movement of which with respect to the body is detected as the bucking signal and transmitted as an anti-bucking signal.

8. A fuel injection pump as defined by claim 4, further characterized in that the inertial mass is a member, preferably a pendulating member, suspended via at least one spring means and connected to the fuel injection pump.

9. A fuel injection pump as defined by claim 4, characterized in that the inertial mass is a member, preferably a pendulating member, suspended via at least one spring means and connected to the engine.

10. A fuel injection pump as defined by claim 8, further characterized in that the pendulating member is supported via a damper means on the body.

11. A fuel injection pump as defined by claim 9, further characterized in that the pendulating member is supported via a damper means on the body.

12. A fuel injection pump as defined by claim 8, further characterized in that the pendulating member is supported via a damper means where it is suspended.

13. A fuel injection pump as defined by claim 9, further characterized in that the pendulating member is supported via a damper means where it is suspended.

14. A fuel injection pump as defined by claim 12, further characterized in that the pendulating member is located in an interior portion of the fuel injection pump and effects changes in the basic setting of the fuel supply quantity adjusting device via an actuating arm.

15. A fuel injection pump as defined by claim 4, further characterized in that the setting lever is elastically movable against a stop by a restoring force.

16. A fuel injection pump as defined by claim 15, further characterized in that the setting lever and the actuating means are disposed in an interior portion of the fuel injection pump.

17. A fuel injection pump as defined by claim 1, further characterized in that said actuating means comprises a rotatable cam.

18. A fuel injection pump as defined by claim 4, further characterized in that said actuating means comprises a rotatable cam.

19. A fuel injection pump as defined by claim 1, further characterized in that the actuating means comprises a hydraulic control motor having a piston which is movable between limiting stops.

20. A fuel injection pump as defined by claim 4, further characterized in that the actuating means comprises a hydraulic control motor having a piston which is movable between limiting stops.

21. A fuel injection pump as defined by claim 1, further characterized in that the actuating device comprises an adjusting magnet, an armature of which is movable between limiting stops and a current circuit of which is controlled via a switch actuatable in accordance with the anti-bucking signal to trigger an adjusting movement.

22. A fuel injection pump as defined by claim 18, further characterized in that the cam is directly connected, via a lever movable between stops, with a mechanical device for transmitting the relative movement of the mass elastically supported with respect to the body of the vehicle.

23. A fuel injection pump as defined by claim 22, further characterized in that a differentiating member is incorporated into the transmitting device.

24. A fuel injection pump as defined by claim 18, further characterized in that a fluidic positive displacement device is provided as a bucking signal transducer, said transducer being connected to the elastically supported mass on the one hand and to the body of the vehicle on the other hand, said transducer being adapted to produce a working movement, triggered by the relative movement of the elastically supported inertial mass, by which a fluid chamber is varied in volume and further by which a piston is adjustable to trigger an adjusting movement of the actuating means.

25. A fuel injection pump as defined by claim 20, further characterized in that a fluidic positive displacement device is provided as a bucking signal transducer, said transducer being connected to the elastically supported mass on the one hand and to the body of the vehicle on the other hand, said transducer being adapted to produce a working movement, triggered by the relative movement of the elastically supported inertial mass, by which a fluid chamber is varied in volume and further by which a piston is adjustable to trigger an adjusting movement of the actuating means.

26. A fuel injection pump as defined by claim 24, further characterized in that the piston is coupled with a switch disposed in an electric current circuit, by means of which the actuating means is controlled.

27. A fuel injection pump as defined by claim 21, further characterized in that a switch is provided between the elastically supported inertial mass and the body.

28. A fuel injection pump as defined by claim 24, further characterized in that a switch is provided between the elastically supported inertial mass and the body.

29. A fuel injection pump as defined by claim 1, further characterized in that a switch is provided to control a current circuit of a magnetic valve having a valve closing member for controlling a pressure fluid connection of a control pressure chamber leading to a first pressure fluid source, the control pressure chamber being adapted to communicate continuously with a second pressure source via a throttle and being defined by a piston acting as the actuating means, which piston is subjected on one side to a prevailing pressure in the second pressure source and on an opposite side to a force exerted by a restoring spring, whereby the piston is urged toward that pressure source having the higher pressure level.

30. A fuel injection pump as defined by claim 27, further characterized in that a differentiating member is incorporated into a connection provided among the elastically suspended inertial mass, the switch, and the body, by means of which differentiating member a rapid change of position of the inertial mass is converted into the anti-bucking signal.

31. A fuel injection pump as defined by claim 29, further characterized in that a differentiating member is incorporated into a connection provided among the elastically suspended inertial mass, the switch, and the body, by means of which differentiating member a rapid change of position of the inertial mass is converted into the anti-bucking signal.

32. A fuel injection pump as defined by claim 30, further characterized in that the differentiating member comprises a shock absorber unit, by means of which the switch is retained in an outset position when slow positional changes of the elastically suspended inertial mass occur, especially those effected by the engine, and by means of which the switch is actuated when fast positional changes of the inertial mass occur.

33. A fuel injection pump as defined by claim 31, further characterized in that the differentiating member comprises a shock absorber unit, by means of which the switch is retained in an outset position when slow positional changes of the elastically suspended inertial mass occur, especially those effected by the engine, and by means of which the switch is actuated when fast positional changes of the inertial mass occur.

34. A fuel injection pump as defined by claim 25, further characterized in that the fluid chamber communicates via a throttle and a connection line with a fluid pressure source, from which connection line a further line having a check valve disposed therein leads back toward the fluid chamber.

35. A fuel injection pump as defined by claim 34, further characterized in that a pressure maintenance valve opening toward the fluid pressure source is provided in the connection line leading from the throttle to the fluid pressure source.

36. A fuel injection pump as defined by claim 32, further characterized in that the differentiating member has an enclosed housing positively associated with the body, in which closed housing a tightly-sealing adjustable wall element is provided in which element a throttle is disposed, said adjustable element being urged on one side by a compression spring supported on a spring plate and on the other side being connected with one contact of the switch, and the spring plate is provided with unthrottled relief passages and further is coupled directly with the elastically suspended inertial mass and another contact of the switch.

37. A fuel injection pump as defined by claim 32, further characterized in that the differentiating member has an enclosed housing in which a tightly-sealing adjustable wall element is provided and in which wall element a throttle is disposed, said wall element being connected with a support part further connected to the elastically suspended inertial mass and between the support part and the housing a spring is provided, said support part being connected to one contact of the switch while the other contact of the switch is connected with the enclosed housing.

* * * * *